United States Patent [19]
Yamada et al.

[11] 4,364,919
[45] Dec. 21, 1982

[54] PROCESS FOR PRODUCING COARSE GRAINS OF ALUMINUM HYDROXIDE

[75] Inventors: Koichi Yamada; Takuo Harato; Hisakatsu Kato; Yasumi Shiozaki, all of Niihama, Japan

[73] Assignee: Sumitomo Aluminium Smelting Company, Limited, Osaka, Japan

[21] Appl. No.: 347,546

[22] Filed: Feb. 10, 1982

[30] Foreign Application Priority Data

Feb. 20, 1981 [JP] Japan ................................. 56-24780

[51] Int. Cl.³ ............................................... C01F 7/14
[52] U.S. Cl. .................................... 423/629; 423/127; 423/121; 23/301; 23/305 A
[58] Field of Search ........................ 423/127, 121, 629; 23/301, 305 A

[56] References Cited

U.S. PATENT DOCUMENTS

| 3,649,184 | 3/1972 | Featherson | 423/629 |
| 4,014,985 | 3/1977 | Haleen et al. | 423/629 |
| 4,049,773 | 9/1977 | Mejell et al. | 423/121 |
| 4,234,559 | 11/1980 | Tschamper | 423/121 |
| 4,305,913 | 12/1981 | Anjier | 423/121 |
| 4,311,486 | 1/1982 | Yamada et al. | 423/121 |

FOREIGN PATENT DOCUMENTS

| 2807245 | 5/1979 | Fed. Rep. of Germany | 423/127 |
| 49-4696 | 1/1974 | Japan | 423/629 |
| 6404751 | 11/1964 | Netherlands | 423/629 |
| 1548168 | 7/1979 | United Kingdom | 423/127 |

Primary Examiner—Herbert T. Carter

Attorney, Agent, or Firm—Stevens, Davis, Miller & Mosher

[57] ABSTRACT

Coarse grains of aluminum hydroxide having high resistance to disintegration to powder in a calcination step are continuously produced from a supersaturated sodium aluminate solution of the Bayer process through (1) a first precipitation step of adding recycle seed aluminum hydroxide to a supersaturated sodium aluminate solution having a molar ratio of $Na_2O$ as caustic soda to $Al_2O_3$ in solution of less than 1.8 supplied to a precipitation tank of substantially complete mixing type in a ratio of 30–150 kg of the recycle seed to 1 $m^3$ of the solution, thereby partially decomposing the seed-added solution until the molar ratio of the solution reaches 2.0–2.4 while keeping the solution at 65°–80° C.;

(2) a second precipitation step of supplying the resulting sodium aluminate solution in a slurry state from the first precipitation step to at most three precipitation tanks of growth type arranged in series and decomposing the solution in the slurry state until the molar ratio reaches at least 2.6 while keeping the solution in the slurry state at a precipitated solid aluminum hydroxide concentration of 400–1,500 g/l and at a slurry temperature of 45°–65° C. in the precipitation tanks of growth type, and (3) a third step of supplying the decomposed solution in a slurry state from the second precipitation step to a classifier, thereby classifying the precipitated aluminum hydroxide grains into coarse grains of aluminum hydroxide as product and fine grains of aluminum hydroxide, and recycling the fine grains of aluminum hydroxide as seed.

3 Claims, 2 Drawing Figures

PROCESS FOR PRODUCING COARSE GRAINS OF ALUMINUM HYDROXIDE

The present invention relates to a process for producing alumina by the Bayer process or its modified process, which will be hereinafter referred to as "Bayer process", and more particularly to a process for economically obtaining coarse grains of aluminum hydroxide having less susceptibility to disintegration to powder, when calcined, in a high yield in the production of alumina from bauxite by the Bayer process.

As is well known, alumina as a raw material for production of aluminum is classified into two groups according to the grain size of alumina, that is, (1) floury alumina usually containing more than 20% by weight of grains passing through 325-mesh Tyler sieve, and (2) sandy alumina usually containing less than 10-15% by weight of grains passing through 325-mesh Tyler sieve. Recently, sandy alumina, that is, coarse grains of aluminum hydroxide, has been increasingly utilized on account of automation of aluminum electrolytic production, etc.

According to the recent increasing demand for the coarse particles, the present invention disclosed a process for economically obtaining coarse grains of aluminum hydroxide having less susceptibility to disintegration to fine powder, when calcined in a gas stream or in a fluidized state in high yield (Japanese patent application No. 103295/79; U.S. patent application Ser. No. 175,535, now U.S. Pat. No. 4,311,486, Canadian patent application No. 357,815; Australian patent application No. 61391/80; German patent application No. P3030631.1). The disclosed prior art process is based on such a finding that when the crystals constituting the coarse grains of aluminum hydroxide are coagulated masses of the primary grains mainly having grain sizes of 10-30 µm, a very good resistance to the disintegration to fine powder can be obtained. That is, the prior art process provides a process for producing coarse grains of aluminum hydroxide from sodium aluminate solution, which comprises dividing supersaturated sodium aluminate solution being prepared by the Bayer process and having a molar ratio of $Na_2O$ as caustic soda to $Al_2O_3$ in solution of less than 1.8 into two streams of sodium aluminate solution, adding aluminum hydroxide as seed to one of the streams of sodium aluminate solution, partially decomposing the seed-added stream until the molar ratio of the sodium aluminate solution reaches 1.8-2.6, adding the other stream of sodium aluminate solution, which has been cooled to a temperature low enough to lower the temperature of the partially decomposed stream of sodium aluminate solution in a slurry state at least by 3° C., to the partially decomposed stream of sodium aluminate slurry, and decomposing the mixed slurry of sodium aluminate until a molar ratio of the mixed slurry reaches at least 2.6, wherein an improvement comprises adding a portion of recycle seed aluminum hydroxide and fine grains of aluminum hydroxide as seed to one of the streams of sodium aluminate solution, partially decomposing the sodium aluminate solution until the molar ratio of the sodium aluminate solution reaches 1.8-2.6, adding to the resulting partially decomposed sodium aluminate slurry the other stream of sodium aluminate solution, which has been cooled to a temperature low enough to lower the temperature of the partially decomposed sodium aluminate slurry by at least 3° C., and the remaining portion of recycle seed aluminum hydroxide, and then further decomposing the cooled and mixed sodium aluminate slurry until the molar ratio of the sodium aluminate slurry reaches 2.6-4.0.

However, the prior art process has such disadvantages that it is necessary to use as seed separately prepared fine grains of aluminum hydroxide having an average grain size of 10 µm or less, that is, the fine grains of aluminum hydroxide as seed must be prepared by cooling of and/or addition of aluminum hydroxide gel to a separately prepared, supersaturated sodium aluminate solution. Consequently, in the practice of the prior art process it is required to control grain sizes and amounts of fine grains of aluminum hydroxide to be used as seed with complicated operations, including an additional separate step for preparing the fine grains of aluminum hydroxide, resulting in increasing the production cost on the whole.

As a result of further extensive studies of a process for economically producing coarse grains of aluminum hydroxide under these situations, the present inventors have found a process for economically producing coarse grains of aluminum hydroxide in high yield by using a specific combination of precipitation tanks of so-called growth type in the so far well known apparatus for a precipitating treatment tank, in which precipitated solid aluminum hydroxide can be retained for a longer retention time than that for a sodium aluminate solution in the same tank, and precipitation tanks of complete mixing type without separately preparing fine grains of aluminum hydroxide to be used as seed.

The present invention provides a process for producing coarse grains of aluminum hydroxide by continuously precipitating coarse grains of aluminum hydroxide from a supersaturated sodium aluminate solution of the Bayer process, which comprises:

(1) a first precipitation step of adding recycle seed of aluminum hydroxide to a supersaturated sodium aluminate solution having a molar ratio of $Na_2O$ as caustic soda to $Al_2O_3$ in solution of less than 1.8 supplied to a precipitation tank of substantially complete mixing type in a ratio of 30-150 kg of the recycle seed to 1 m³ of the solution, thereby partially decomposing the seed-added solution until the molar ratio of the solution reaches 2.0-2.4 while keeping the solution at 65°-80° C.;

(2) a second precipitation step of supplying the resulting sodium aluminate solution in a slurry state from the first precipitation step to at most three precipitation tanks of growth type arranged in series and decomposing the solution in the slurry state until the molar ratio reaches at least 2.6 while keeping the solution in the slurry state at a precipitated solid aluminum hydroxide concentration of 400-1,500 g/l and at a slurry temperature of 45°-65° C. in the precipitation tanks of growth type, and (3) a third step of supplying the decomposed solution in a slurry state from the second precipitation step to a classifier, thereby classifying the precipitated aluminum hydroxide grains into coarse grains of aluminum hydroxide as product and fine grains of aluminum hydroxide, and recycling the fine grains of aluminum hydroxide as seed.

The process of the present invention will be described in detail below, referring to the accompanying drawings, but will not be limited to the embodiment shown therein.

Figure 1:
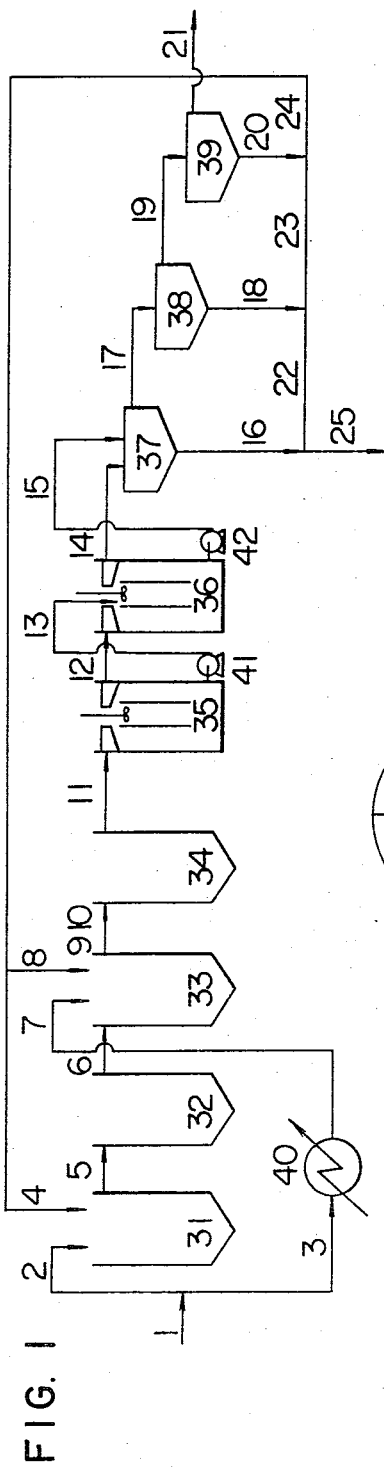
FIG. 1 is a flow diagram showing one embodiment of the process of the present invention.

In the practice of the process of the present invention, precipitation tanks 31 and 32 of substantially complete mixing type are used in the first precipitation step of FIG. 1. A supersaturated sodium aluminate solution having a molar ratio of $Na_2O$ as caustic soda to $Al_2O_3$ in solution of less than 1.8 is supplied to the precipitation tank 31 through conduits 1 and 2, and separately recycle aluminum hydroxide as seed is added to the precipitation tank 31 through conduit 4 to promote nucleation in the supersaturated sodium aluminate solution. By keeping the solution at 65°–85° C., the nucleated crystals of aluminum hydroxide and recycled seed are agglomerated, and the solution is subjected to decomposition until the molar ratio reaches 2.0–2.4.

In the second precipitation step comprising precipitation tanks 35–36, the solution in a slurry state from the first precipitation step is kept at 65°–45° C. by cooling of the solution or by adding thereto a cooled supersaturated sodium aluminate solution, which is cooled in a coiler 40. In the precipitation tanks 35 and 36 of so-called growth type in which precipitated solid aluminum hydroxide can be retained for a longer retention time than that for a sodium aluminate solution in the same tank, the solution in a slurry state is decomposed to precipitate aluminum hydroxide until the molar ratio reaches at least 2.6 while keeping the solution at a solid aluminum hydroxide concentration of 400–1,500 g/l in the precipitation tanks. The sodium aluminate solution withdrawn through conduit 14 and the aluminum hydroxide slurry withdrawn through conduit 15 from the final precipitation tank 42 of growth type, in which the molar ratio has reached 2.6 or higher, are separately, or after joined together, are supplied to classifiers 37, 38 and 39 to withdraw coarse grains of aluminum hydroxide as product through conduits 16 and 25, and fine grains of aluminum hydroxide as recycle seed through conduits 18, 20, 23 and 24. Occasionally, the relatively coarse grains of aluminum hydroxide from the classifier 38 is capable to be withdrawn as product through conduits 18, 22 and 25.

In the second precipitation step of the present invention, the precipitation tanks of growth type with an increased concentration of solid aluminum hydroxide are used, and it is essential to use at most three precipitation tanks of such type connected to each other in series. If the molar ratio does not reach the said desired value in the final precipitation tank of growth type, precipitation tanks 33 and 34 of conventional, completely mixing type shown in FIG. 1 is provided at the upstream side of the series of the precipitation tanks of growth type to prolong the precipitation time or another series of the precipitation tanks of growth type are provided in parallel.

The precipitation tanks of growth type according to the present invention are provided to have the following three functions:

(1) to reshape the grains of aluminum hydroxide precipitated in the first precipitation step, because they have an irregular shape like that of a bunch of grapes, etc.
(2) to promote the growth of grains, and
(3) to promote fine grain generation by secondary nucleation.

According to the studies of the present inventors', coarse grains are produced in the first precipitation step mainly due to agglomeration of grains, but the formed grains are not always in a special shape, and contain grains of irregular shape like that of a bunch of grapes. If such grains are subjected to further growth as such in the precipitation step by circulation therein, the grains are likely to be cracked by the circulation to produce grains having sizes of 20–40 μm. Moreover, the thus produced grains have less activity to agglomerate themselves into coarse grains. Thus, the grains themselves are made into coarse grains only through the growth of primary crystals, and consequently the desired coarse grains of aluminum hydroxide cannot be obtained. To improve such bottleneck situation, the solid concentration of the solution in a slurry state in the precipitation tanks of growth type is kept at 400–1,500 g/l to reshape the grains of irregular shape into those of spherical shape by collision between the grains before a firm agglomeration by the growth of primary irregular shape grains takes place. Furthermore, the precipitation tanks of growth type, as their name implies, are the ones suitable for growth of grains, where the reshaped grains can grow to firm coarse grains. However, it is not preferable to use 4 or more precipitation tanks of growth type connected in series, because the growth proceeds excessively and resistance to disintegration to fine powder at calcination is lowered.

On the other hand, the other conditions for the second precipitation step, that is, keeping of the temperature of a sodium aluminate solution at 45°–60° C. under the condition of a higher molar ratio than that of the sodium aluminate solution to be supplied to the first precipitation step, promotes formation of fine grains, due to disintegration of the grains of irregular shape by collision between such grains and also due to the so-called secondary nucleation. Such phenomenon has been so far regarded as undesirable for the production of coarse grains of aluminum hydroxide. However, the present inventors have found in the present invention the application of this phenomenon to the process for producing coarse grains of aluminum hydroxide having good resistance to disintegration to powder at a calcination step and comprising agglomerated grains of small primary crystals by recyclically using the fine grains formed by attrition in the second precipitation step as seed after separation of coarse grains of aluminum hydroxide in the classification steps as product without using the fine grains of aluminum hydroxide as seed separately prepared as disclosed in the said Japanese patent application No. 103295/79.

In the present invention, the first precipitation step is generally kept at a temperature of 65°–80° C., and the fine aluminum hydroxide seed grains are added to the first precipitation step in a ratio of 30–150 kg of the seed grains per m³ of the sodium aluminate solution under the said condition, and decomposition of sodium aluminate is continued until the molar ratio reaches 2.0–2.4. If the molar ratio is less than 2.0 in the resulting solution of sodium aluminate in a slurry state from the partial decomposition in the first precipitation step, the molar ratio of sodium aluminate in the slurry is lowered after admixture with cooled sodium aluminate solution in the second precipitation step, thereby inevitably producing a large amount of fine grains of aluminum hydroxide. On the other hand, if the decomposition is carried out until the molar ratio reaches more than 2.4, the retention time will be much prolonged in the second precipitation step, rendering the process uneconomical.

If the ratio of the seed grains is less than 30 kg, good precipitation efficiency of aluminum hydroxide cannot be obtained, though it depends upon the temperature of admixed sodium aluminate slurry for the precipitation and the molar ratio of $Na_2O/Al_2O_3$, and the growth of primary crystals is promoted thereby, or much nucleation takes place to the contrary, and desired agglomerated grains cannot be obtained. On the other hand, if the ratio of seed grains exceeds 150 kg, the precipitation efficiency is not improved correspondingly, and the amount of seeds to be recycled in the tanks is increased to the contrary, requiring apparatuses of larger size. This also makes the process uneconomical.

It is not always necessary to conduct the addition of seed aluminum hydroxide grains at one location. That is, the first precipitation step can be divided into a plurality of steps within the said ratio of seed grains to be added, and the seed grains can be added thereto dividedly, or the recycle aluminum hydroxide grains can be divided into the relatively coarse grains and finer grains in advance, and the finer grains can be added to the first precipitation step where nucleation is likely to take place, so that the nucleation-inducing effect and agglomeration activity of finer grains themselves can be utilized to a maximum and the coarse grains to the second precipitation step where grain growth is likely to take place.

The recycle aluminum hydroxide grains means the residue aluminum hydroxide grains separated from the coarse grains of aluminum hydroxide as product, usually the coarse grains having sizes of 60 μm or larger.

The recycle seed having the average partial size of 50–90 μm is preferably used for the production of coarse aluminum hydroxide.

When the average particle size of the recycle seed is less than 50 μm, it is difficult to produce coarse product, for example, such as 90 μm. If the average particle size of the recycle seed is larger than 90 μm, it is difficult to get economical precipitation rate due to a low surface area of the recycle seed.

The precipitation tank of substantially complete mixing type to be used in the first precipitation step means an agitation tank with stirrer blades or a mechanical or pneumatic agitation tank with a draft tube as used so far in the relevant technical field, in which a substantially equal slurry concentration can be maintained throughout the tank.

Figure 2:
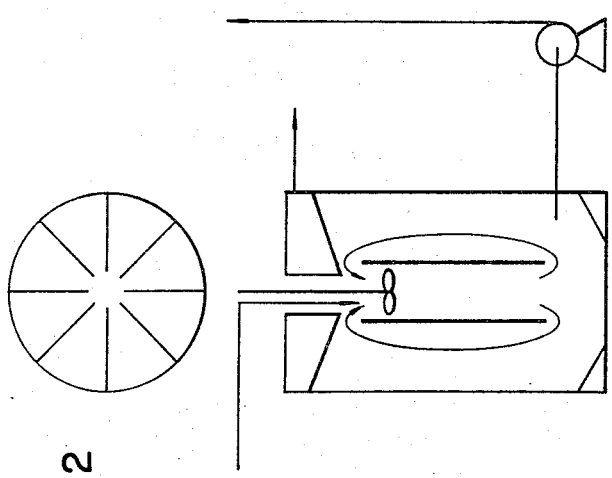
FIG. 2 shows an example of a precipitation tank of growth type for use in the process of the present invention.

In the second precipitation step of the present invention, a precipitation tank of growth type as illustrated in FIG. 2 is used, and the sodium aluminate solution in a slurry state is led to the tank from the first precipitation step, and is subjected to decomposition until the molar ratio reaches 2.6 or higher while keeping the solution at a concentration of solid aluminum hydroxide of 400–1,500 g/l and a temperature of 45°–65° C. therein. If the concentration of solid aluminum hydroxide is less than 400 g/l in a precipitation tank of growth type, collision frequency between the solid grains is lowered, making less occurrence of fine grains. That is, only coarse grains of aluminum hydroxide having the large size of primary crystals, i.e. aluminum hydroxide having low resistance to disintegration to powder in a calcination step, are obtained. On the other hand, if the concentration exceeds 1,500 g/l, it will be difficult to handle the slurry.

As the precipitation tank of growth type for the second precipitation step, any tank can be used, so far as it is in such a structure that a supernatant can be withdrawn from a supernatant zone, provided within the tank and outside the tank as an annexed part and a slurry of solid aluminum hydroxide can be withdrawn from a thick slurry zone so that the precipitated solid aluminum hydroxide can be retained longer than that for the sodium aluminate solution in the same tank. For example, apparatuses as disclosed in Japanese Patent Publication No. 22893/73, Japanese Laid-open patent application No. 58458/74 and Japanese Laid-open patent application No. 136121/80 can be used.

In the another practice of the present invention, a supersaturated solution of sodium aluminate having a molar ratio of $Na_2O$ as caustic soda/$Al_2O_3$ of less than 1.8 can be divided into two streams of sodium aluminate solution in advance, one of the streams can be admixed with a portion of recycle aluminum hydroxide seed grains and subjected to partial decomposition until the molar ratio of the sodium aluminate solution reaches 1.8 or more, but less than the set molar ratio (2.0–2.4) for the first precipitation step to precipitate aluminum hydroxide, and then the partially decomposed sodium aluminate solution in a slurry state can be admixed with the other stream of sodium aluminate solution, which has been cooled to a temperature low enough to lower the temperature of the partially decomposed stream of sodium aluminate solution in a slurry state at least by 3° C., and the remaining portion of the recycle aluminum hydroxide seed grains. This procedure is much preferable because the degree of supersaturation of the slurry can be sufficiently elevated with the result that a higher molar ratio can be attained after the decomposition and the decomposition yield can be also increased.

In this manner, precipitation is continued in the first precipitation step until the molar ratio of sodium aluminate solution reaches 2.0–2.4, and the resulting solution in a slurry state is decomposed in the second precipitation step until the molar ratio exceeds 2.6. The resulting decomposed sodium aluminate slurry is supplied to a plurality of classifiers according to the ordinary procedure. The coarsest grains of aluminum hydroxide are obtained as the underflow from a first classifier 37, and then washed and calcined to produce coarse grains of product alumina. The overflow at the first classifier 37 is led to a successive classifier 38, in which classification is made into fine grains of aluminum hydroxide as the underflow from the classifier, and a sodium aluminate solution as the overflow. The resulting overflow can be further led to successive classifier 39, if necessary, for further classification, or supplied to a bauxite digestion step as a recycle sodium aluminate solution through conduit 21. On the other hand, the whole or a portion of the resulting underflow can be led to the first precipitation step as the recycle aluminum hydroxide seed grains.

As described in detail above, the following advantages can be obtained according to the present process.

(1) Since the activity of seed can be kept always constant by addition of fine grains of aluminum hydroxide as seed, the product aluminum hydroxide having substantially uniform grain size can be obtained. That is, the stable product can be continuously obtained.

(2) Even if the resulting product aluminum hydroxide is calcined by flash calcination, etc., less disintegration to fine powder occurs, and thus the dimension of the calcining facility can be reduced and consumption of fuel such as heavy oil, etc. can be saved.

(3) Since the second precipitation step can be carried out at a lower temperature than that of the conventional precipitation procedure for producing sandy alumina, the molar ratio can be enhanced at the end of decomposition.

(4) Since the primary grain size of aluminum hydroxide as seed is small, the surface area of the seed is large, and consequently the precipitation rate of aluminum hydroxide is high.

(5) The precipitation efficiency can be considerably enhanced by using precipitation tanks of growth type with high solid concentration.

In the present invention, the population balance of particles and the formed grain size can be substantially stabilized by using precipitation tanks of growth type under the specific conditions, and using the resulting fine grains of aluminum hydroxide as recycle aluminum hydroxide seed.

In an actual process, the amount of the fine grains as seen can be appropriately adjusted while counting the particle number balance or maintaining the primary grain size of 10-30 $\mu$m in the first precipitation step by means of a coulter counter or electron microscope.

Needless to say, it is also possible to add a small amount of fine grains of aluminum hydroxide as separately adjusted according to the prior art process of the said Japanese patent application No. 103295/79 to the first precipitation step, if necessary.

The present invention will be further described in detail below, referring to Example, but the present invention is not restricted thereto.

EXAMPLE

A sodium aluminate solution having a molar ratio of 1.6 ($Na_2O$: 110 g/l) at 72° C. was supplied at a rate of 0.063 m$^3$/hr through conduit 1 according to the flow diagram shown in FIG. 1, and divided into two streams in a proportion of 1:1. One stream was fed to a precipitation tank 31 through conduit 2, and another stream to cooler 40 through conduit 3.

To the precipitation tank 31 were also supplied a sodium aluminate slurry containing 700 kg/m$^3$ of recycle aluminum hydroxide seed at a rate of 0.003 m$^3$/hr through conduit 4.

Total residence time in the precipitation tanks 31 and 32 was about 25 hours, and the sodium aluminate slurry containing precipitated aluminum hydroxide, discharged through conduit 6 had a temperature of 70° C. and a molar ratio of 2.27.

On the other hand, the stream of sodium aluminate solution led to the cooler 40 through the conduit 3 was cooled to 58° C. by the cooler 40 and then supplied to a precipitation tank 33 through conduit 7. To the precipitation tank 33 was also supplied a slurry containing recycle aluminum hydroxide seed with the same composition as supplied to the precipitation tank 31 at a rate of 0.0074 m$^3$/hr through conduit 8. The temperature of the admixed sodium aluminate slurry in the precipitation tank 33 was lowered to about 63° C. Residence time in precipitation tanks 33-34 was about 17 hours, and the sodium aluminate solution discharged from conduit 11 had a molar ratio of 2.50.

Then, the resulting solution in a slurry state was supplied to precipitation tanks 35 and 36 of growth type as shown in FIG. 2. The precipitation tanks 35 and 36 each had a solid concentration of about 650 g/l in their slick slurry section, a residence time of about 16 hours for the sodium aluminate solution, and that of about 75 hours for the solid aluminum hydroxide. The sodium aluminate slurry discharged through conduit 14 had a temperature of 57° C. and a molar ratio of 3.21.

The thus discharged sodium aluminate slurry was led to classifier 37, to classify solid aluminum hydroxide into coarse grains and fine grains and the coarse grains of aluminum hydroxide became product through conduits 16 and 25, and the fine grains of aluminum hydroxide were used as recycle aluminum hydroxide seed through conduit 24, as described before. The overflow from the classifier 37 was fed to classifiers 38 and 39 to classify and separate solid aluminum hydroxide and aluminate liquor. The underflow from the classifier 38 and that from 39 were used as the recycle aluminum hydroxide seed through conduits 18, 23 and conduit 20 respectively.

On the other hand, the coarse grains of aluminum hydroxide discharged from the classifier 37 were washed and calcined in a short kiln with a flash type calciner (cyclone type), and grain size distribution of the resulting alumina was measured. The results are also shown in Table.

COMPARATIVE EXAMPLE

Precipitated aluminum hydroxide was obtained in the same manner as in Example, except that 4 precipitation tanks of growth type were provided in series after the precipitation tank 34 in place of 2 precipitation tanks of growth type.

The sodium aluminate solution in an aluminum hydroxide slurry discharged through conduit 14 after the completion of precipitation had a temperature of 54° C. and a molar ratio of 3.53. Grain size distribution of aluminum hydroxide grains is shown in Table. As is evident from Table, coarse grains of aluminum hydroxide having high resistance to disintegration to powder at calcination can be obtained according to the present invention, whereas the aluminum hydroxide grains obtained in Comparative Example had smaller grain sizes and failed to meet the physical properties required for the coarse grains of aluminum hydroxide.

TABLE

| Grain size (Tyler mesh) | Example | | Comp. Ex. |
| --- | --- | --- | --- |
| | Aluminum hydroxide (%) | Alumina (%) | Aluminum hydroxide (%) |
| +100 | 1.2 | 0.2 | 0.8 |
| +150 | 27.2 | 16.3 | 12.2 |
| +200 | 80.0 | 69.7 | 53.1 |
| +325 | 97.0 | 95.1 | 84.3 |

What is claimed is:

1. A process for producing coarse grains of aluminum hydroxide by continuously precipitating coarse grains of aluminum hydroxide from a supersaturated sodium aluminate solution of the Bayer process, which comprises:
   (1) a first precipitation step of adding recycle seed aluminum hydroxide to a supersaturated sodium aluminate solution having a molar ratio of $Na_2O$ as caustic soda to $Al_2O_3$ in solution of less than 1.8 supplied to a precipitation tank of substantially complete mixing type in a ratio of 30-150 kg of the recycle seed to 1 m$^3$ of the solution, thereby partially decomposing the seed-added solution until the molar ratio of the solution reaches 2.0–2.4 while keeping the solution at 65°–80° C.;
(2) a second precipitation step of supplying the resulting sodium aluminate solution in a slurry state from the first precipitation step to at most three precipitation tanks of growth type arranged in series and decomposing the solution in the slurry state until the molar ratio reaches at least 2.6 while keeping the solution in the slurry state at a precipitated solid aluminum hydroxide concentration of 400–1,500 g/l and at a slurry temperature of 45°–65° C. in the precipitation tanks of growth type; and
(3) a third step of supplying the decomposed solution in a slurry state from the second precipitation step to a classifier, thereby classifying the precipitated aluminum hydroxide grains into coarse grains of aluminum hydroxide as product and fine grains of aluminum hydroxide, and recycling the fine grains of aluminum hydroxide as seed.

2. The process according to claim 1, wherein in the first precipitation step the supersaturated sodium aluminate solution to the first precipitation step is divided into two streams of sodium aluminate solution, one of the streams is admixed with a portion of the recycle seed aluminum hydroxide and partially decomposed until the molar ratio becomes more than 1.8 but less than the set molar ratio for the first precipitation step, thereby precipitating aluminum hydroxide, and then the partially decomposed sodium aluminate solution in a slurry state is admixed with the other stream of sodium aluminate solution, which has been cooled to a temperature low enough to lower the temperature of the partially decomposed stream of sodium aluminate solution in a slurry state at least by 3° C., and the remaining portion of recycle seed aluminum hydroxide, thereby precipitating aluminum hydroxide until the molar ratio of the admixed slurry reaches the set molar ratio of the first precipitation step.

3. The process according to claim 1, wherein the recycle seed having an average particle size of 50–90 $\mu$m is used.

* * * * *